Patented Sept. 6, 1932

1,875,466

UNITED STATES PATENT OFFICE

HUGH KNIGHT, OF GLENDORA, CALIFORNIA, ASSIGNOR, BY DIRECT AND MESNE ASSIGNMENTS, TO EMULSOIDS, INC., OF NEW YORK, N. Y., A CORPORATION OF DELAWARE

INSECTICIDE

No Drawing. Application filed November 11, 1929. Serial No. 406,534.

My invention relates to compounds which have heretofore not been known to possess insecticidal properties but which do have these powers in a very marked degree, with the added advantage of being non-injurious to plant life, when used under certain conditions, as hereinafter pointed out.

Fatty acids are known to possess insecticidal value, but their injurious effects upon plants have discouraged, in fact precluded their use for the extermination of that great class of insect pests which attack plant life.

I have discovered, however, that there are certain derivatives or compounds of the fatty acids, which are relatively non-injurious to plant life under certain conditions and prescriptions of use, yet are powerfully insecticidal. It may be reasonably inferred that the agent in the fatty acid which is destructive of plant tissue or which burns the plants, is the acid hydrogen of the fatty acids, and this inference seems to be conclusively supported by the fact that when this acid hydrogen radical is replaced by a hydrocarbon radical the injurious effects of the compound are removed or largely eliminated without however diminishing its insecticidal value.

I have discovered that the esters of the fatty acids derived from animal or vegetable fats or oils, such as cottonseed, cocoanut, castor, linseed and other vegetable oils, and fish oil, whale oil, tallow and other animal fats are insecticidal and non-injurious to plant life. While the butyl-acetyl-esters of the fatty acids are insecticidal, they do not exhibit the poisonous potency of the butyl-esters, but possess extraordinary emulsifying powers, as set out in my application for "Emulsifier and insecticide", filed October 28, 1929, Serial Number 403,128. The insecticidal butyl-ester compounds are completely soluble in oil particularly a petroleum hydrocarbon and this is of especial advantage because owing to the high cost of the butyl-esters dilution in oil is desirable and such dilution does not reduce the insecticidal strength but may in fact enhance its strength when diluted in the proper petroleum. The butyl-esters of the fatty acids may of course be used without dilution in oil, that is, they may be used as such, when mixed with water as a carrier, and applied at a dilution of from one to three parts in one hundred parts of water, but on account of their high cost, it is found to be economical to dilute them first with petroleum oil, as set forth later.

Of the various butyl-esters of the fatty acids that may be used as insecticides, I have found that the butyl-ester of ricinoleic acid is preferable for the extermination of the armored scale usually found on citrus trees. For instance, if a mixture consisting of two parts by volume of butyl-ricinoleate and one part of butyl-acetyl-ricinoleate and ninety seven parts by volume of water be thoroughly mixed and agitated and then sprayed to the red scale on citrus, perhaps the most difficult of all the scale insects to kill, a complete kill has consistently resulted, without any injurious effects on the trees.

The butyl-esters of the fatty acids may be rendered capable of mixing with water to form a milky fluid with the aid of an emulsifier, of which there are many. I prefer, however, butyl-acetyl-ester of recinoleic acid or its homologues, more fully disclosed in my said above mentioned application, this emulsifying ester being soluble in the butyl-ester insecticide, and when mixed with water and agitated, producing a very powerful (emulsified) insecticide. These butyl-esters and butyl-acetyl-esters of the fatty acids are readily soluble in petroleum oil to the degree of dilution desired and needed for the extermination of a particular pest. For general use, however, I have found that from 10% to 20% of the ester will be sufficient.

For the purpose of dilution, I prefer to use a liquid petroleum distillate and may employ different fractions of varying degrees of refinement according to the pest to be treated and the circumstances governing application. I may for example use a liquid petroleum distillate of an oil of the kerosene group, with a viscosity not to exceed 55 seconds Sayboldt, and a saturation percentage not exceeding 85, though the question of saturation is not so important in this class of oils as in the lubricating oils. The addition of these esters to petroleum oils permits the use of much lighter fractions, hence reducing the hazard of injury. In fact I have repeatedly sprayed a mixture consisting of the butyl-esters and butyl-acetyl-esters and raw kerosene in substantially the proportions given on the tender foliage of citrus without injury to either the leaves or fruit thereof.

The following is exemplary of an insecticidal, emulsifiable compound involving any of the esters of the fatty acids derived from animal or vegetable fats or oils dissolved in a liquid petroleum hydrocarbon.

Butyl-ester (Butyl-ricinoleate) 10%.
Butyl-actyl-ester (Butyl-acetyl-ricinoleate) 2%.
Diluted with kerosene 88%.

The compound thus constituted and prepared is ready for immediate use or, not being subject to deterioration, corruption, or taint, may be kept indefinitely in a closed container. When this compound is vigorously agitated with water, an emulsion results, and this emulsion may be applied at the dilution required by the nature of the pest that it is desired to kill. If a more stable emulsion be required, the quantity of the emulsifier should be increased.

Since however, the discovery that the esters, and especially the butyl-esters of the fatty acids derived from animal or vegetable fats or oils, are potently insecticidal, is the essence of this invention, I would have it understood that the use of any emulsifier, where such is desirable, as an ingredient of an insecticidal compound consisting of an ester of a fatty acid whether dissolved in a petroleum oil or not, is included in this disclosure, as a part of my invention.

What I claim, is:

1. An insecticide comprising butyl-ricinoleate and an emulsifier.

2. An insecticide which comprises a liquid petroleum distillate, an alkyl ester of a higher fatty acid soluble therein, and an emulsifying agent.

3. An insecticide which comprises a liquid petroleum distillate, an alkyl ester of a higher fatty acide soluble therein, and a water-mineral oil emulsifying agent.

4. An insecticide which comprises liquid petroleum distillates, alkyl esters of fatty acids derived from substances composing the group: animal fats, vegetable fats, animal oils, and vegetable oils, said esters being soluble in the hydrocarbons, and an emulsifying agent.

5. An insecticide which comprises alkyl esters of fatty acids derived from substances composing the group: animal fats, vegetable fats, animal oils, and vegetable oils.

6. An insecticide which comprises butyl esters of fatty acids derived from substances composing the group: animal fats, vegetable fats, animal oils, and vegetable oils.

7. An insecticide which comprises alkyl esters of fatty acids derived from substances composing the group: animal fats, vegetable fats, animal oils, vegetable oils, and an emulsifier soluble in said esters.

8. An insecticide which comprises esters of fatty acids derived from substances composing the group: animal fats, vegetable fats, animal oils, vegetable oils, an emulsifier soluble in said esters, and butyl acetyl ricinoleate.

9. An insecticide which comprises liquid petroleum distillates of the kerosene group, alkyl esters of fatty acids derived from substances composing the group: animal fats, vegetable fats, animal oils, and vegetable oils, said esters being soluble in the petroleum distillates, and an emulsifying agent.

10. An insecticide which comprises butyl ricinoleate and a liquid petroleum distillate.

11. An insecticide which comprises butyl ricinoleate, and an emulsifier, dissolved in a liquid petroleum distillate.

12. An insecticide which comprises butyl ricinoleate, butyl acetyl ricinoleate and a liquid petroleum distillate.

13. An insecticide which comprises a liquid petroleum distillate and an alkyl ester of a fatty acid derived from substances composing the group: animal fats, vegetable fats, animal oils, and vegetable oils, said ester being soluble in the said liquid petroleum distillate.

14. An insecticide which comprises an alkyl ester of a fatty acid derived from substances composing the group: animal fats, vegetable fats, animal oils and vegetable oils.

15. An insecticide which comprises an ester of a monohydroxy alcohol and a fatty acid derived from substances composing the group: animal fats, vegetable fats, animal oils and vegetable oils.

In testimony whereof I have set my hand.

HUGH KNIGHT.